US007389413B2

(12) United States Patent
Bandini et al.

(10) Patent No.: US 7,389,413 B2
(45) Date of Patent: *Jun. 17, 2008

(54) METHOD AND SYSTEM FOR FILTERING COMMUNICATION

(75) Inventors: Jean-Christophe Bandini, San Carlos, CA (US); Daryl Odnert, Mountain View, CA (US); Dmitry Dolinsky, San Francisco, CA (US)

(73) Assignee: Tumbleweed Communications Corp., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/508,779

(22) Filed: Aug. 23, 2006

(65) Prior Publication Data

US 2006/0282888 A1    Dec. 14, 2006

Related U.S. Application Data

(63) Continuation of application No. 10/154,137, filed on May 22, 2002, now Pat. No. 7,117,358.

(51) Int. Cl.
*G06F 21/00* (2006.01)

(52) U.S. Cl. ............. 713/153; 713/164; 380/259; 705/50; 726/12; 726/14; 726/24

(58) Field of Classification Search ................ 713/154, 713/181, 153, 164; 380/259; 726/12, 14, 726/24; 705/50
See application file for complete search history.

(56) References Cited

U.S. PATENT DOCUMENTS

| 5,276,869 A | 1/1994 | Forrest et al. |
| 5,278,984 A | 1/1994 | Batchelor |
| 5,283,856 A | 2/1994 | Gross et al. |
| 5,377,354 A | 12/1994 | Scannell et al. |
| 5,555,346 A | 9/1996 | Gross et al. |
| 5,619,648 A | 4/1997 | Canale et al. |
| 5,623,600 A | 4/1997 | Ji et al. |

(Continued)

FOREIGN PATENT DOCUMENTS

EP    0 420 779 A2    3/1991

(Continued)

OTHER PUBLICATIONS

Press Release, Integralis Annouces MIMEsweeper Compatible with Check Point FireWall-1 on Single NT Server, Sep. 16, 1996 (document apparently printed Sep. 30, 2003), 2 pages.

(Continued)

*Primary Examiner*—Emmanuel L Moise
*Assistant Examiner*—Paul Callahan
(74) *Attorney, Agent, or Firm*—Zagorin O'Brien Graham LLP

(57) ABSTRACT

A e-mail relay provides message filtering services to an e-mail network. The e-mail relay monitors incoming communication and intercepts e-mail messages. The e-mail relay compares attributes of the messages to data derived from SPAM messages, which is stored in a SPAM database. The e-mail relay restricts the delivery of message based on the comparison such as by restricting the delivery of messages having attributes close to those of SPAM messages from the SPAM database. The SPAM database is constructed by responding to user or administrator indications as to whether received messages are SPAM messages.

61 Claims, 4 Drawing Sheets

U.S. PATENT DOCUMENTS

| | | |
|---|---|---|
| 5,632,011 A | 5/1997 | Landfield et al. |
| 5,802,253 A | 9/1998 | Gross et al. |
| 5,889,943 A | 3/1999 | Ji et al. |
| 5,905,777 A | 5/1999 | Foladare et al. |
| 6,072,942 A | 6/2000 | Stockwell et al. |
| 6,182,118 B1 | 1/2001 | Finney et al. |
| 6,311,277 B1 | 10/2001 | Takaragi et al. |
| 6,385,655 B1 | 5/2002 | Smith et al. |
| 6,424,718 B1 | 7/2002 | Holloway |
| 6,466,932 B1 | 10/2002 | Dennis et al. |
| 6,609,196 B1 | 8/2003 | Dickinson et al. |
| 6,651,166 B1 | 11/2003 | Smith et al. |
| 7,117,358 B2 * | 10/2006 | Bandini et al. ............. 713/153 |
| 7,127,741 B2 | 10/2006 | Bandini et al. |
| 7,162,738 B2 | 1/2007 | Dickinson, III et al. |
| 2002/0169954 A1 | 11/2002 | Bandini et al. |
| 2002/0199095 A1 | 12/2002 | Bandini et al. |
| 2004/0193922 A1 | 9/2004 | Bandini et al. |
| 2005/0081059 A1 | 4/2005 | Bandini et al. |
| 2007/0005983 A1 | 1/2007 | Dickinson, III et al. |

FOREIGN PATENT DOCUMENTS

| | | |
|---|---|---|
| GB | 2318486 | 4/1998 |
| JP | 8-263404 A | 10/1996 |
| WO | WO 96/35994 | 11/1996 |
| WO | WO 99/05814 | 2/1999 |

OTHER PUBLICATIONS

Cheswick, W.R. and Bellovin, S.M., "Firewalls and Internet Security-Repelling the Wily Hacker," Addison Wesley 1st ed., 1994, 298 pages.

Integralis Asia Pacific, "Total Email Content Management Countering Email Borne Threats," White Paper MIMIsweeper, Jan. 1996, pp. 1-12.

Press Release, Integralis releases MIMEsweeper Version 2.0 SMTP mail security support, Jan. 15, 1996 (document apparently received from 3rd Party and apparently printed Jun. 8, 2004), 2 pages.

Press Release, Integralis announces version 2.3 of MIMEsweeper with new email security features, Jun. 13, 1996 (document apparently received from 3rd Party and apparently printed Jun. 8, 2004), 2 pages.

Author unknown, 3rd party search of internet archive (2 pages) and printouts (31 pages), apparently representing content archived from http://www.nha.com circa Nov. 12, 1996. Printouts include pages apparently descriptive of a MIMEsweeper (documents apparently received from 3rd Party and apparently printed Jun. 8, 2004), 33 pages.

Pollock, Stephen, "A Rule-Based Message Filtering System," ACM Transactions on Office Information Systems, vol. 6, No. 3, Jul. 1, 1998, pp. 232-254.

Smith, Richard E., "Constructing a High Assurance Mail Guard," Secure Computing, San Jose, CA, 1994, pp.1-10.

* cited by examiner

METHOD AND SYSTEM FOR FILTERING COMMUNICATION

PRIORITY CLAIM

This application is a continuation of U.S. patent application Ser. No. 10/154,137, filed May 22, 2002, now U.S. Pat. No. 7,117,358, entitled "METHOD AND SYSTEM FOR FILTERING COMMUNICATION".

FIELD OF THE INVENTION

The present invention relates to communication systems, and more particularly to electronic message delivery.

BACKGROUND OF THE INVENTION

Receiving unwanted electronic messages, such as e-mail, wastes time and valuable resources. Electronic message communication has become a prevalent, and perhaps preferred, method of communication. Such communication is apparent in most aspects of daily life including the workplace, the home, and even the road. At the workplace, the messages may arrive from clients, partners, customers, or other employees. Additionally, unwanted messages commonly known as "SPAM" are received by users. The circumstances are similar for the home user where both wanted and unwanted SPAM messages are received. Reviewing the SPAM messages consumes time, which may be highly valuable in the case of workplace time, and may also undermine the user's capacity to receive other, desirable, messages. Accordingly, there is a need for a method that reduces the number of SPAM messages users receive.

SUMMARY OF THE INVENTION

Therefore, in accordance with the invention, a method is presented for reducing the number of SPAM messages received by users of a protected e-mail network. The method includes providing an e-mail relay between the e-mail network and the public network to scans incoming messages intended for local recipients of a computer network. The e-mail relay has available a database of messages known to be SPAM. The e-mail relay intercepts an incoming message. The e-mail relay compares attributes of the incoming message to attributes of messages in the SPAM database. If the comparison result is beyond a threshold match level, the e-mail relay restricts the delivery of the message.

DETAILED DESCRIPTION OF THE INVENTION

Figure 1:
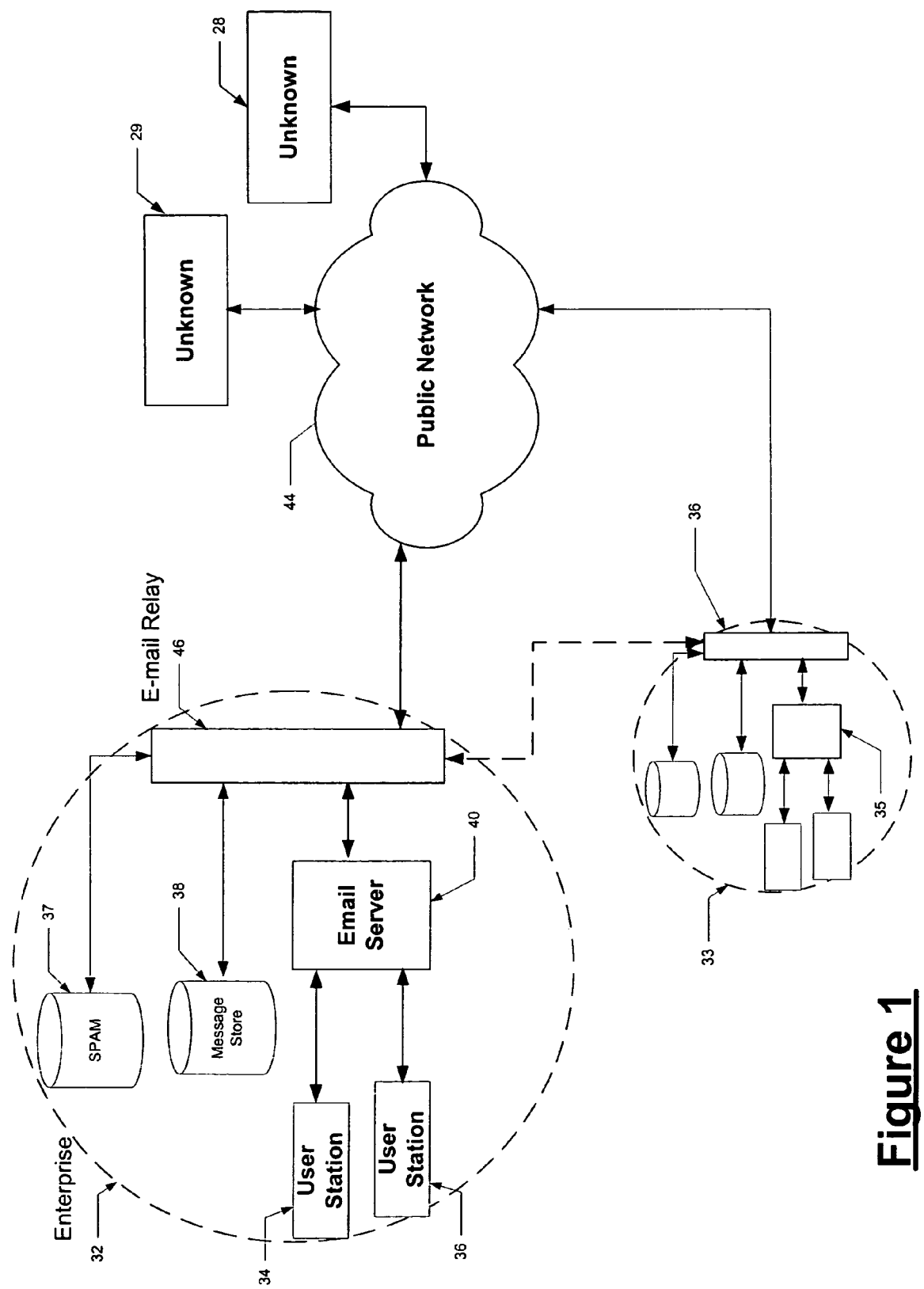
FIG. 1 illustrates a network arrangement, which includes a e-mail relay, in accordance with the invention.

The invention is discussed by reference to figures illustrating the structure and operation of an example system. First, the logical structure of a network arrangement according to the invention is described. Next, the operation of the e-mail relay of the network arrangement is discussed by reference to flow diagrams. Finally, the specific operation of the e-mail relay in comparing and collecting known SPAM messages is discussed by reference to corresponding flow diagrams.

The structure of a network, in which a reduced number of SPAM messages are received by users of the protected enterprise, will now be discussed with reference to FIG. 1. Although, the discussion below refers to the protected network resources as part of an enterprise, protected resources of the invention additionally include other types of organizations and network resources such as internet service providers and corresponding subscribers and an Internet webmail site protecting user accounts. The illustrated network arrangement includes user stations 34, 36, an e-mail server 40, a public network 44, and an email relay 46 in accordance with the invention. The user stations 34, 36, and the e-mail server 40 are coupled together by a network such as a Local Area Network (LAN). The network is used to internally couple enterprise resources in a generally trusted manner since the network is preferably separated from the external, or public, network 44 by an access firewall (not shown). The access firewall is discussed only for purposes of explanation and is not required for operation of embodiments employing the principles of the present invention. The public network 44 is preferably a Wide Area Network (WAN) such as the Internet. The public network 44 facilitates communication of e-mail messages to the local network.

The e-mail relay 46 is preferably interposed behind the common access firewall, on the "safe side" of the access firewall. The e-mail relay 46 advantageously takes a form as described in further detail herein to filter e-mail messages received from outside the protected enterprise. Preferably, the e-mail relay 46 takes the form of a program executing on a conventional general purpose computer. In one embodiment, the computer executes the Windows NT or Windows 2000 operating systems available from Microsoft Corp., of Redmond, Wash. In other embodiments, the computer executes a Unix operating system such as Solaris from Sun Microsystems, of Mountain View, Calif. In some embodiments, the e-mail relay 46 includes processes and data distributed across several computer systems, which are logically operating as a single e-mail relay in accordance with the invention. Although the e-mail relay 46 is shown as operating on e-mail messages between an internal site and an external site, the e-mail relay 46 may also be used to filter e-mail messages between two internal sites. Furthermore, the e-mail relay 46 can be used to filter outgoing messages, such as those, for example, from a hacker employing the enterprise resources to transmit SPAM messages.

The email relay 46 is coupled to an e-mail server 40 associated with the enterprise 32. The e-mail server 40 preferably facilitates processing of e-mail messages by local user stations 34, 36. In one embodiment, the e-mail server 40 is configured as a Simple Mail Transfer Protocol (SMTP) server. As may be appreciated, the e-mail server 40 is only one of the resources provided by the enterprise 32. The enterprise 32 usually includes various resources to facilitate communication, administration, and other business tasks.

The e-mail relay 46 has available a SPAM database 37 and a message store database 38, which is typically used to store e-mail messages while in transit. As is known, the e-mail relay 46 is associated with additional data storage (not shown) for facilitating proper operation of various aspects of the e-mail relay.

A second e-mail relay 36 is coupled to the public network 44. The second e-mail relay 36 is associated with a second enterprise 33, including a local e-mail server 35. The structure and operation of the second e-mail relay 36 and the second local network are preferably similar to that of corresponding elements of the first local network.

Unknown sender systems 28, 29 are coupled to the public network 44 to transmit e-mail messages to recipients associated with the enterprise 32. Such systems are preferably computer systems associated with each such respective entity. As may be appreciated, some of the systems 28, 29 are composed of various combinations of resources and configuration different from those employed in the illustrated enterprise 32, as is known in the art. Furthermore, the systems 28, 29 may employ various protocols to communicate with respective local stations.

The user stations 34, 36 are preferably user terminals, which are configured to facilitate business processes related to the enterprise's operation. In one embodiment, the user stations 34, 36 are computer systems at employee offices. The user stations 34, 36 are preferably coupled to the e-mail server 40 over the local area network to access e-mail applications.

The e-mail server 40 facilitates the transmission of e-mail messages between user stations 34, 36 and external systems. E-mail messages intended for recipients within the enterprise are processed by the e-mail server 40 and are forwarded to the recipients by way of the local network. E-mail messages intended for recipients outside the enterprise are processed by the e-mail server 40 and are transmitted over a communication link between the e-mail server and the public network 44. The public network 44 proceeds by facilitating delivery of the messages to the various intended recipients.

The e-mail relay 46 operates to filter incoming e-mail messages so as to reduce the number of SPAM messages received by the enterprise 32. In operation, local users are the target of communication from various entities coupled to the public network 44. In one embodiment, at least part of such communication is intercepted by the e-mail relay 46. For example, an outside sender of an e-mail message composes a message and transmits the message over the public network 44 to the enterprise. The email relay 46 intercepts the e-mail message instead of allowing it to proceed to the e-mail server 40, as is known in the art of store and forward protocol, such as SMTP. The e-mail relay 46 determines whether to forward the message to the e-mail server 40 after some inspection. The e-mail server 40 refers to the destination field of the message to identify the local recipient. The message is then transmitted to a user station associated with the local recipient. In another embodiment, the e-mail server 40 transmits the message to the user station only after the user requests the message. For example, e-mail servers executing the Post Office Protocol version 3 (POP3) or Internet Message Access Protocol (IMAP) operate in this manner when receiving messages for associated users.

Figure 2:
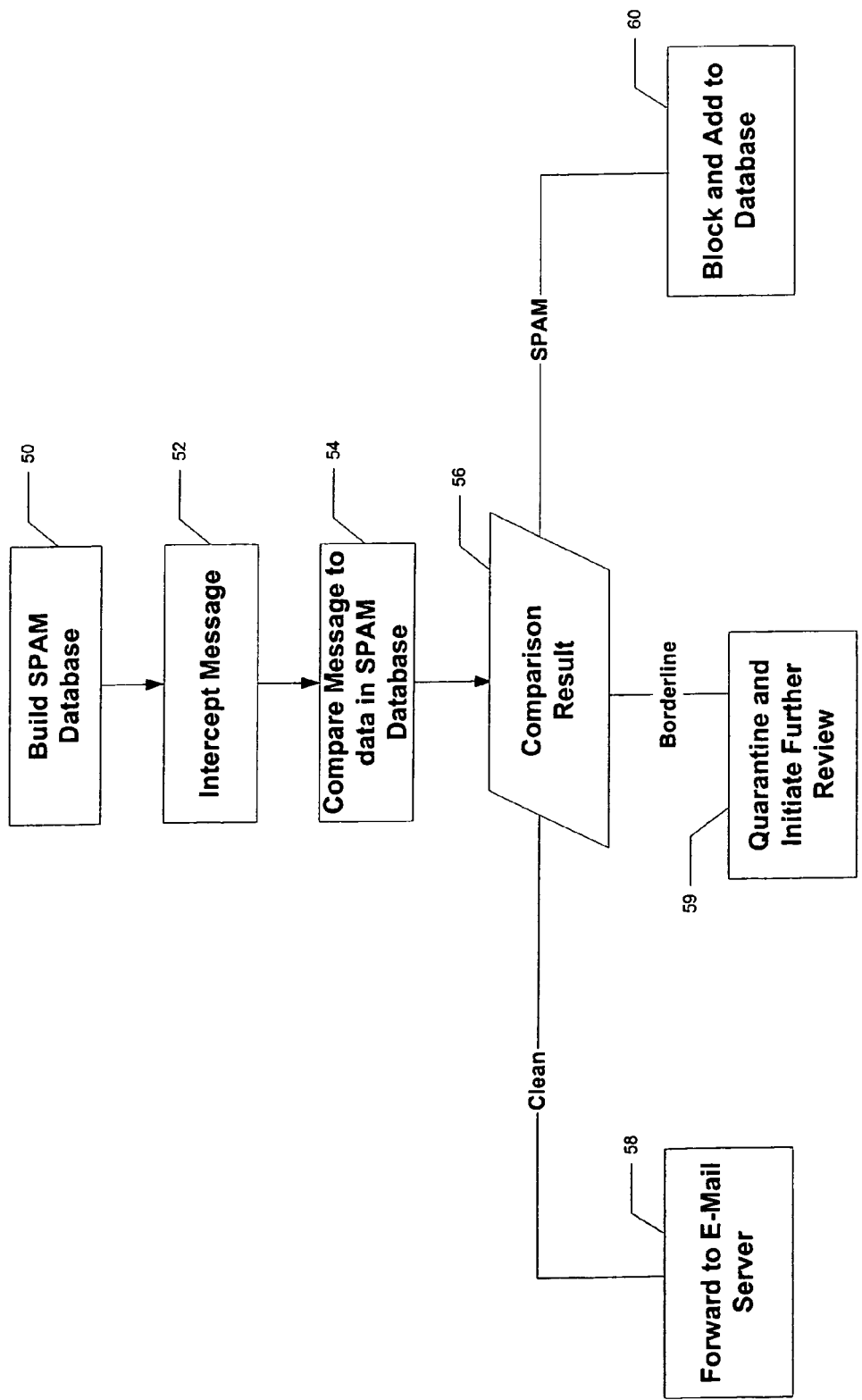
FIG. 2 is a flow diagram illustrating a method for reducing the number of arriving SPAM messages in the network configuration of FIG. 1.

FIG. 2 illustrates a method employed by the e-mail relay 46 to filter SPAM messages in the network arrangement of FIG. 1. The e-mail relay 46 is generally adapted to filter e-mail received into the enterprise 32 by references to attributes of e-mail messages. Particularly, the e-mail relay 46 compares attributes of received e-mail messages to attributes of stored known SPAM messages. The attributes are employed to determine whether an e-mail message should be allowed to flow to the e-mail server 40 or should be diverted and subject to other action. Some of those actions, which the e-mail relay 46 is adapted to execute, include: quarantine the e-mail in the local message store database 38, reject the e-mail, and generate a special message to the intended recipient indicating that the e-mail message has been diverted.

Accordingly, the e-mail relay 46 generally provides two functions, SPAM collection and SPAM filtering. To establish the known SPAM database, the e-mail relay 46 actively and passively collects SPAM from various sources (step 50). The particular methods employed in collecting known SPAM messages to provide the SPAM database 37 are discussed below with reference to FIG. 4. The e-mail relay 46 operates to intercept e-mail messages and extract attribute data from messages (step 52). The extracted attribute data is used to generate a comparison between the intercepted e-mail and e-mail message data in the SPAM database 37 (step 54). A comparison result is then provided (step 56).

In one embodiment, the comparison result can include one of three indications SPAM, clean, and borderline. The three results are provided by setting a threshold range for a comparison score. The range is preferably defined by two levels. The first level is a borderline threshold level and the second level is a SPAM threshold level, which is preferably higher than the borderline threshold level. In one embodiment, the two threshold levels are configurable by an administrator so as to allow for adjusting SPAM filtering sensitivity. When the comparison score is beyond the SPAM threshold level, the result is a SPAM indication, i.e., the e-mail is likely a SPAM message. SPAM messages are preferably blocked and used to update data in the SPAM database 37 (step 60). When the comparison is below the borderline threshold level, the result is a clean indication, i.e., the e-mail is likely not a SPAM message. Clean messages are preferably allowed to proceed to the e-mail server 40 (step 58). Finally, when the comparison score is within the threshold range (higher than the borderline threshold level but lower than the SPAM threshold level), the result is a borderline indication, i.e., additional evaluation is required to determine whether the e-mail is a SPAM message. Borderline messages are preferably quarantined in the Message Store database 38 and are subject to further examination, typically by an administrator (step 59).

Figure 3:
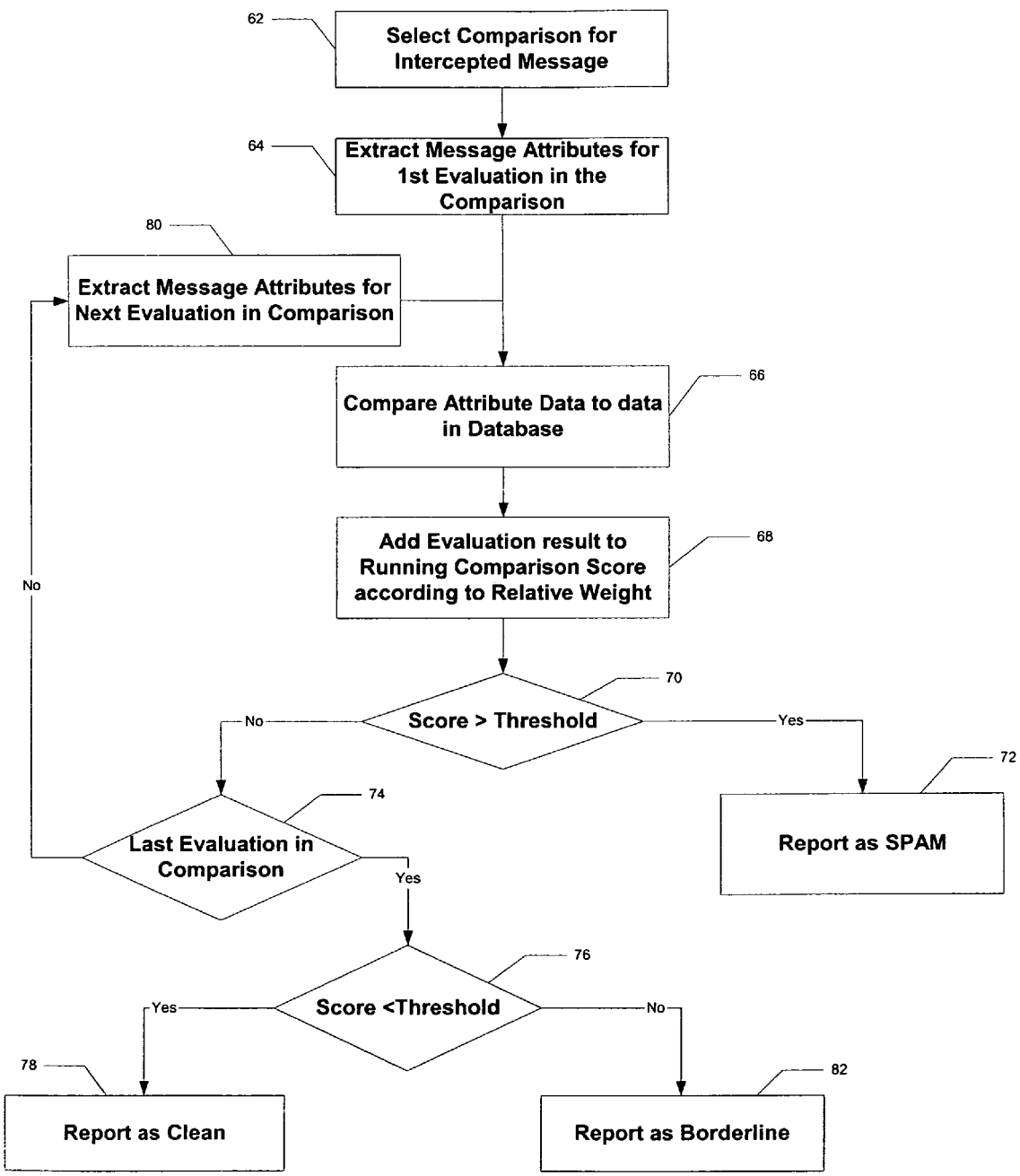
FIG. 3 illustrates a method for collecting SPAM messages to form the SPAM database of FIG. 1.

FIG. 3 illustrates a method for comparing incoming e-mail messages to a collection of e-mail messages in the SPAM database 37. The e-mail relay 46 selects a comparison formula to apply to the integrated message (step 62). In one embodiment, the comparison is selected based on predetermined attributes of intercepted messages such as sender organization, recipient group, and attachment type. A comparison is preferably based on a set of evaluations, as discussed with further detail below.

The intercepted message attribute data relevant to the first evaluation in the comparison is extracted (step 64). The attribute data is examined in accordance with the evaluation (step 66). The evaluation result is added to a running comparison score according to the relative weight of the evaluation (step 68). The email relay 46 determines whether the comparison score has already exceeded the SPAM threshold level (step 70). If the comparison score has already exceeded the SPAM threshold level, the comparison operation reports the message as SPAM. (step 72). If the comparison score has not exceeded the SPAM threshold level, the e-mail relay 46 determines whether the evaluation is the last one in the comparison formula (step 74). If the evaluation is not the last evaluation, the message attribute data for the next evaluation in the comparison are extracted (step 80), and the method proceeds to a corresponding comparison (step 66). If the evaluation is the last evaluation, the e-mail relay 46 determines whether the score is below the borderline threshold level (step 76). If the comparison score is below the borderline threshold level the message is reported as clean (step 78). If the comparison score is not below the borderline threshold level, the message is reported as borderline (step 82).

The database 37 used to store the known SPAM messages is organized so as to facilitate an efficient comparison of such incoming messages. In one embodiment, the database 37 is a relational database such as an Oracle or SQL server. A relational database allows for efficient retrieval of information by employing appropriate indexing, as is known in the art. In one embodiment, each record in the database corresponds to a known SPAM message. The fields of the record preferably correspond to the message header fields such as date, subject, sender, cc, etc. The message body is preferably stored as a Character Large Object or as a Binary Large Object in the message record, as in known in the art. In another embodiment, the message body is stored in one or more other records, which are associated with the master message data record, such as by employing a master-detail pattern relationship. The message recipient identifiers for each message are preferably stored in a different table, where records are associated with corresponding master message data records, as is known in the art.

Information that is derived by processing of the known SPAM messages is also stored in the database 37. In one embodiment, a hash computation result based on the message body, or portions of the message body, is stored in the database 37. The hash result is provided by employing known techniques for generating a hash value from a text collection. This hash value is used by the e-mail relay 46 to quickly determine a match likelihood between a received message body text and a known SPAM message body text. Other data derived from the SPAM messages include URLs found in the message body. These URLs can be stored in a URL table, where records are associated with corresponding SPAM message records by a master-detail pattern relationship. Finally, in one embodiment, a sorted list of e-mail recipients derived from SPAM messages is used to provide for an efficient way of determining when an incoming message includes the same recipient list as a SPAM message. In another embodiment, the SPAM message body text is stored in a database of a Full Text Retrieval System to facilitate efficient searching of textual content in the SPAM message body.

In one embodiment, the e-mail relay 46 performs one or more evaluation steps as part of the overall comparison which determines the likelihood that a message is SPAM. The evaluation steps are made by reference to various attributes of an incoming message, including sender address, recipient list, subject, body, embedded URLs, and IP of sending relay. As may be appreciated, an evaluation on the basis of other attributes of the incoming message can alternatively be made as part of the e-mail filtering of the invention without departing from the teachings of the invention.

In one evaluation, the sender address of the incoming e-mail message is compared to sender addresses of SPAM messages from the SPAM database. It is common for SPAM messages to include a false sender address. However, the same false address is often repeatedly used. Accordingly, a sender address match increases the likelihood that the incoming e-mail message is SPAM. To efficiently match sender addresses, the SPAM database 37 stores an index for the sender fields of records in the database.

In another evaluation, the e-mail relay 46 determines whether the incoming message recipient or recipient list corresponds to a recipient or a recipient list of a SPAM message. E-mail messages that have only one recipient in the recipient field, while the recipient is not associated with the receiving enterprise, are sometimes indicative of a SPAM messages. When an incoming e-mail message includes such a single recipient, who is foreign to the enterprise, the recipient field of records in the SPAM database is searched. A match of an unknown recipient to an unknown recipient in the SPAM database 37 increases the likelihood that the incoming e-mail message is SPAM. A recipient list included in the incoming e-mail message is compared to recipient lists in records of the SPAM database 37. A match of recipient list to a recipient list of a known SPAM message increases the likelihood that the incoming message is SPAM. To efficiently match recipient lists, the recipients lists in SPAM messages are sorted to allow for fast match detection.

In another evaluation, the subject filed of an incoming e-mail is compared to the subject field of records in the SPAM database 37. A match of the subject field of an incoming message with the subject field of a record in the SPAM database 37 increases the likelihood that the incoming e-mail message is SPAM. The SPAM database 37 preferably stores an index based on the subject field to facilitate efficient searching of the records for subject field matches. SPAM messages often include a subject, which has a variable end portion to prevent exact matching by filter programs. Accordingly, in another embodiment, the evaluation discussed above can be further refined to compare only a predefined number of characters from the subject field or provide a comparison result, which is proportional to the number of matching characters from the subject field.

In yet another evaluation, the body of the incoming message is compared to the body of messages in the SPAM database 37. In one embodiment, a hash value is calculated from the incoming e-mail message body. The hash value is compared to hash values computed from body text of messages in the SPAM database 37. A match of the hash value from the incoming message body to the hash value from a record in the SPAM database 37 significantly increases the likelihood that the incoming message is SPAM. In another embodiment, in response to the hash value match, the e-mail relay initiates a more detailed comparison of the incoming e-mail message to SPAM messages in the database 37. In yet another embodiment, the e-mail relay 37 searches for complete sentences and paragraph, which are identified as repeating in SPAM message. In this embodiment, a Full Text Retrieval (FTR) database is preferably employed to search for phrases and keywords to provide a match score.

In another evaluation, any Uniform Resource Locator (URL) included in an incoming message is compared to URLs contained records of the SPAM database 37. The URLs can appear in the message body or in a corresponding Hyper Text Markup Language (HTML) tag, for HTML formatted messages. The URLs extracted from incoming messages are searched for in the SPAM database 37. An increased number of URL matches with those stored in the SPAM database 37 increases the likelihood that the incoming e-mail message is SPAM.

Finally, in a related determination, the identity of the Internet Protocol (IP) address or internet domain from which a SPAM message was received is compared to the IP address or internet domains for the incoming message. The IP address or internet domain of the sending relay is generally not enough on its own to indicate that a message is likely SPAM. However, a match of IP address or internet domain would enhance a finding of likely SPAM by reference to other evaluations.

As may be appreciated, the overall comparison match score, or level, is set by reference to a combination of one or more of the above discussed evaluations. In one embodiment, the overall SPAM likelihood is determined by assigning a weight to each evaluation and combining all weighed scores to arrive at the overall score. In some embodiments, only some of the evaluations are employed. In other embodiments, the evaluations are sequentially applied and are discontinued in response to an accumulated evaluation exceeding a threshold level, as is illustrated in FIG. 3. Thus, other optimization of the comparison score computation can be performed without departing from the teachings of the invention.

Figure 4:
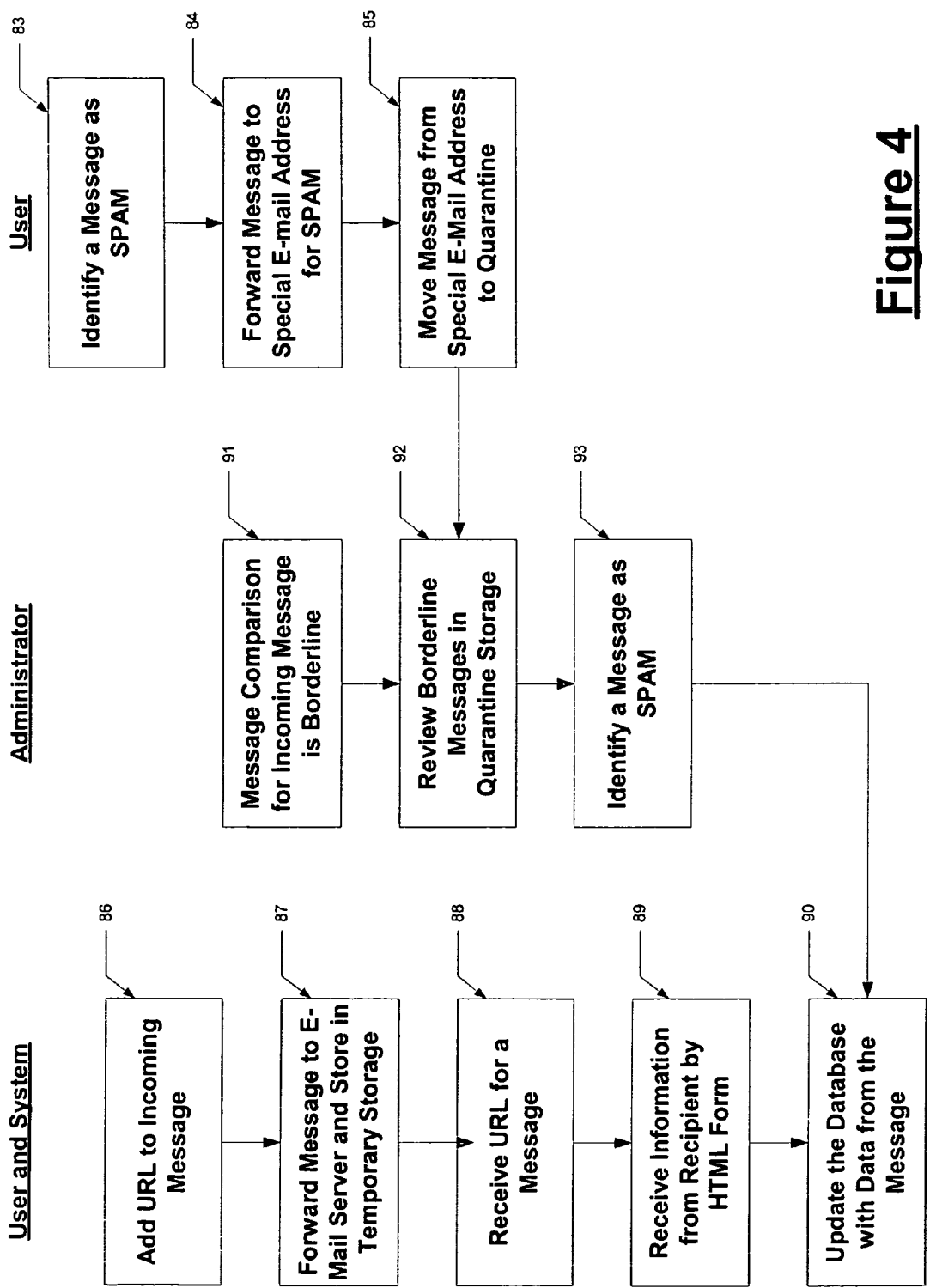
FIG. 4 illustrates a method for comparing incoming messages to messages in the SPAM database in the method illustrated in FIG. 2.

FIG. 4 illustrates a method for building the SPAM database 37 for use with an e-mail relay 46 in accordance with the invention. The SPAM database 37 is preferably compiled by a combination of administrator and end user actions. The illustrated method assumes that the end users are trusted to make appropriate determinations in reporting messages as SPAM.

One stream for channeling SPAM messages to the database is by end users forwarding messages recognized as SPAM to a special e-mail address associated with the e-mail relay. For example, users identifying a message as SPAM will forward the message to spam@enterprise.com (steps 83, 84). In another embodiment, several categories of SPAM are created by providing a plurality of forwarding addresses such as spam-casino@enterprise.com and spam-porn@enterprise.com. When receiving forwarded messages by the special email addresses, the e-mail relay preferably processes the SPAM messages, as discussed above with reference to the organization of the SPAM database 37, to provide SPAM records for comparison to incoming e-mail messages. In one embodiment, the e-mail messages are quarantined for review by an administrator, when the administrator does not wish to rely solely on the users' characterization of forwarded e-mail messages (step 85).

Another method for channeling SPAM messages to the database 37 is by the e-mail relay 46 adding a special URL to incoming messages, which allows users to report the e-mail message as SPAM by selecting the URL. In one embodiment, the URL is unique to the message so as to allow the e-mail relay 46 to identify the message (step 86). The message is preferably stored in the message store of the e-mail relay 38 (step 87). This temporary storage is preferably indexed by an identifier that is included in the URL, which was added to the e-mail message. In one embodiment the e-mail relay 46 provides an HTTP server to receive URL submissions from users. In response to the HTTP server receiving a URL, (step 88) the e-mail relay 46 retrieves the message from the store 38 by reference to the URL, and adds the message to the SPAM message database 37 by appropriate processing. In one embodiment, the HTTP server returns an HTTP page to the user to express gratitude for the user's submission of SPAM. In another embodiment, the HTTP server prompts the user for further information about the message before adding the message data to the SPAM database 37 (step 89). For example, the user may be prompted to classify the SPAM message according to one of several pre-established categories. The e-mail relay 46 updates the SPAM database 37 with the data from the message (step 90).

Incoming messages having a comparison score that is within the threshold range, are processes by interaction with an intended recipient or an administrator. In one embodiment, when an incoming message is determined to be borderline, i.e., not clearly SPAM, the e-mail relay 46 sends a special e-mail message to the intended recipient to indicate that an intended message has been quarantined. The special e-mail message preferably contains a URL for initiating a retrieval session with the HTTP server of the e-mail relay 46. During the retrieval session, the recipient is provided certain information regarding the incoming e-mail, such as sender, subject, and portions of the message body. The recipient is also provided with a form that includes controls to specify whether the message is SPAM. The e-mail relay 46 respond to the user selections to either deliver the message or add the message data to the SPAM database 37.

In another embodiment, illustrated in FIG. 4, borderline messages are processed by an administrator. A message is determined to be borderline (step 91). The e-mail relay 46 provides an interface for an administrator to review quarantined messages (step 92). The administrator is preferably provided with a form, similar to that provided to a recipient, to indicate whether the borderline message is SPAM. When a message is identified as SPAM (step 93), the SPAM database 37 is updated with message data (step 90). On the other hand, when the message is not identified as SPAM, it is delivered is the ordinary course to the designated recipient or recipients.

It may be appreciated that a message may be reported as SPAM several times by the same or different recipients. In one embodiment, SPAM database records include a field for a submission count, corresponding to each SPAM message. The submission count is preferably used as part of the comparison formula to add weight to certain evaluations. For example, when a subject match is for a SPAM record with a high submission count, the subject match result should have an increased weight since the message is very likely to be a repeat of the SPAM message (as were the previous repeat submissions). Accordingly, the system of the invention employs attributes in addition to those inherent in the SPAM message itself to detect incoming SPAM. For example, another external attribute is the time of transmission (day, hour), which can indicate an increased likelihood of a positive comparison for partial matches and other borderline comparisons.

In another embodiment, the first e-mail relay 46 cooperated with the second e-mail relay 36 to share data from the SPAM database 37, 45. Accordingly, the first e-mail relay 46 and the second e-mail relay 36 exchange data so as to synchronize the SPAM data stored in each of the local SPAM databases 37, 45. As may be appreciated, the exchange of data allows for a recently operational e-mail relay to benefit from the data gathered by another previously operating e-mail relay. The sharing of SPAM data allows for increased detection of SPAM messages such as when the first e-mail relay provides SPAM data to the second e-mail relay prior to the corresponding SPAM messages arriving at the second e-mail relay, thereby allowing the second e-mail relay to intercept the corresponding SPAM messages by employing the shared data. Preferably, the exchange of SPAM data between e-mail relays is part of an agreement between entities to share efforts in preventing the reception of SPAM. In another embodiment, the exchange of SPAM data is by e-mail relays associated with a single organization or set of related organizations, such as affiliated companies.

In an alternate embodiment, the SPAM database is a central database, which is shared by several e-mail relays. In one embodiment, each e-mail relay employs a comparison and evaluations, which are configured by the local administrator. In another embodiment, the comparison and evaluations are stored in the central SPAM database and are employed by all e-mail relays sharing the database. The SPAM data is preferably provided to the database by the e-mail relays forwarding SPAM messages for processing by the database. In one embodiment, the e-mail relays serve as an intermediary between end users in facilitating the method for collecting SPAM discussed with reference to FIG. 4. In another embodiment, the e-mail relays perform some preprocessing before providing the SPAM data to the central database. In one form, such preprocessing is by extracting data from the SPAM message and forming a record that is ready for insertion into the database. As may be appreciated, various other configurations and divisions of labor are possible in facilitating the sharing of a central database by e-mail relays operating in accordance with the invention.

Although the present invention was discussed in terms of certain preferred embodiments, the invention is not limited to such embodiments. A person of ordinary skill in the art will appreciate that numerous variations and combinations of the features set forth above can be utilized without departing from the present invention as set forth in the claims. Thus, the scope of the invention should not be limited by the preceding description but should be ascertained by reference to claims that follow.

The invention claimed is:

1. A method for controlling reception of messages in an e-mail network, the method comprising:
   providing an e-mail relay, the e-mail relay interposed along a message communication path to an e-mail server of the e-mail network;
   the e-mail relay receiving a message intended for a recipient associated with the e-mail network;
   the e-mail relay comparing the received message to message data from a database, the database storing message data corresponding to messages previously received by the e-mail-relay and previously flagged as undesirable messages;
   the e-mail relay executing at least one predetermined action in response to determining that the message is undesirable; and
   the e-mail relay allowing the message to proceed to at least one recipient in response to determining that the message is not undesirable.

2. The method of claim 1, wherein communication of the message is in accordance with an SMTP protocol.

3. The method of claim 1,
   wherein the message communication path is from a public network to the e-mail server, and
   wherein the public network includes the Internet.

4. The method of claim 1, wherein said at least one predetermined action comprises adding message data to the database, the added message data corresponding to the received message.

5. The method of claim 1, wherein said comparing the received message to the message data from the database comprises:
   identifying at least one evaluation associated with comparison of the received message to the message data;
   for each evaluation associated with the comparison:
      extracting data from the message in accordance with parameters associated with the identified evaluation;
      executing the evaluation for the extracted data by comparing the extracted data to corresponding attributes of the message data from the database;
      determining a new comparison score based on the executed evaluation; and
      determining that the received message is undesirable if the comparison score is beyond a threshold.

6. The method of claim 5, wherein the threshold is a threshold range.

7. The method of claim 5, wherein said at least one evaluation comprises comparing a sender address of the received message to a sender address information stored in records of the database.

8. The method of claim 5, wherein said at least one evaluation comprises comparing a recipient of the received message with recipient information stored in records of the database.

9. The method of claim 5, wherein said at least one evaluation comprises comparing a recipient list of the received message with recipient list information stored in records of the database.

10. The method of claim 5, wherein said at least one evaluation comprises comparing content from a portion of a subject field of a message header with the content of subject field information stored in records of the database.

11. The method of claim 5, wherein said at least one evaluation comprises generating a hash value based on message body and further comparing the generated hash value to hash values stored in records the database.

12. The method of claim 5, wherein said at least one evaluation comprises comparing a portion of message body text to message body text portions stored in records of the database.

13. The method of claim 5, wherein said at least one evaluation comprises comparing a URL embedded in the received message to URLs stored in records of the database.

14. The method of claim 5, wherein said at least one evaluation comprises comparing an IP domain of a sending relay associated with the received message to sending relay IP domain information stored in records of the database.

15. The method of claim 5, further comprising:
   storing in the database the number of times an undesirable message was received by the e-mail relay.

16. The method of claim 6, wherein a comparison score within the threshold range results in a "borderline" determination, indicating that it is not certain that the message is undesirable.

17. The method of claim 16, further comprising: the e-mail relay quarantining the received message in response to a borderline determination.

18. The method of claim 17, further comprising:
   queueing the quarantined messages for administrator review and classification as either undesirable or "clean."

19. The method of claim 17, further comprising:
   the e-mail relay notifying an intended receipient that the received message has been quarantined; and
   the e-mail relay receiving from the intended recipient an indication of whether the quarantined message is undesirable.

20. The method of claim 6, wherein a comparison score over the threshold range results in an "undesirable" determination, indicating that the message is likely undesirable.

21. The method of claim 6, wherein a comparison score below the threshold range results in a "Clean" determination, indicating that the message is likely not undesirable.

22. The method of claim 21, further comprising:
   the e-mail relay forwarding the message to an e-mail server in response to the "clean" determination.

23. The method of claim 1, wherein the database includes a local database store of message data maintained by the e-mail relay.

24. The method of claim 1, wherein the database includes a central database store, which is shared between a plurality of e-mail relay systems.

25. The method of claim 1, wherein the e-mail relay shares data from the database with at least one other e-mail relay associated with a second database.

26. The method of claim 1, further comprising:
adding to the database, message data corresponding messages identified by a recipient as undesirable and forwarded to at least one e-mail address associated with the e-mail relay.

27. The method of claim 1, further comprising:
adding to the database, message data corresponding to quarantined messages reviewed by an administrator and determined to be undesirable.

28. The method of claim 1, wherein unwanted messages are collected by recipients replying to unwanted messages and including a special code word within the reply.

29. The method of claim 1, further comprising:
the e-mail relay associating a reporting URL with the received message, the reporting URL allowing a recipient to report the received message as an undesirable message.

30. The method of claim 5, wherein said comparison for evaluating is based on characteristics which are selected from the group comprising message content, sender, subject, embedded URLs, Internet domain of the sending relay and IP address of the sending relay.

31. A method for filtering unwanted messages destined for an e-mail network, the method comprising:
providing an e-mail relay;
providing a database storing message data corresponding to a plurality of messages previously received by the e-mail relay and previously flagged as undesirable messages;
the e-mail relay intercepting a message destined for the e-mail network;
the e-mail relay comparing attributes of the intercepted message to attributes of the message data stored in the database to determine whether the intercepted message is an unwanted message; and
the e-mail relay blocking message transmission to the e-mail network in response to a determination that the intercepted message is an unwanted message.

32. A system for controlling the reception of undesirable messages by resources associated with a local network, the system comprising:
an e-mail relay interposed along a communication path between the resources and a public network, the e-mail relay intercepting messages destined for the resources from the public network; and
a database storing attributes of known undesirable messages, the stored attributes corresponding to messages previously intercepted by the e-mail relay and previously flagged as undesirable messages, the e-mail relay comparing attributes of an intercepted message to the stored attributes of known undesirable messages by performing at least one evaluation related to the attributes of the intercepted message, the e-mail relay executing at least one predetermined action if a comparison score based on matching the attributes of the intercepted message and attributes from records in the database exceeds a threshold.

33. The system of claim 32, wherein the messages are communicated in accordance with an SMTP protocol.

34. The system of claim 32, wherein the public network is the Internet.

35. The system of claim 32, wherein said at least one predetermined action comprises adding message data to the database, the added message data encoding attributes of the intercepted message.

36. The system of claim 32, wherein the threshold is a threshold range.

37. The system of claim 32, wherein said at least one evaluation comprises comparing a sender address of the intercepted message to sender address attributes of records in the database.

38. The system of claim 32, wherein said at least one evaluation comprises comparing an intended recipient of the intercepted message to recipient address attributes of records in the database.

39. The system of claim 32, wherein said at least one evaluation comprises comparing a recipient list of the intercepted message with recipient list attributes of records in the database.

40. The system of claim 32, wherein said at least one evaluation comprises comparing content from a portion of the subject field of the intercepted message header with subject field attributes of records in the database.

41. The system of claim 32, wherein said at least one evaluation comprises generating a hash value based on the message body of the intercepted message and further comparing the generated hash value to hash values stored in records of the database.

42. The system of claim 32, wherein said at least one evaluation comprises comparing a portion of the message body text of the intercepted message to message body text attributes stored in records of the database.

43. The system of claim 32, wherein at least one evaluation comprises comparing a URL embedded in the intercepted message to URL attributes stored in records of the database.

44. The system of claim 32, wherein said at least one evaluation comprises comparing the IP domain of a sending relay associated with the intercepted message to sending relay IP domain attributes stored in records of the database.

45. The system of claim 32, wherein said at least one evaluation comprises storing in the database the number of times an undesirable message was received by the e-mail relay.

46. The system of claim 36, wherein a comparison score within the threshold range results in a "borderline" determination, indicating that it is not certain that the message is undesirable.

47. The system of claim 46, further comprising:
a quarantine for holding the intercepted message in response to a borderline determination.

48. The system of claim 47, further comprising:
an interface whereby an administrator reviews quarantined messages for classification as either undesirable or "clean."

49. The system of claim 47,
wherein the e-mail relay notifies an intended recipient that the intercepted message has been quarantined, and
wherein the e-mail relay receives from the intended recipient an indication of whether the message is undesirable.

50. The system of claim 36, wherein a comparison score over the threshold range results in an "undesirable" determination, indicating that the message is likely undesirable.

51. The system of claim 36, wherein a comparison score below the threshold range results in a "Clean" determination, indicating that the message is likely not an undesirable message.

52. The system of claim 51, wherein the e-mail relay forwards the intercepted message to an e-mail server in response to the "clean" determination.

53. The system of claim 32, wherein the database is includes a local database store of message data maintained by the e-mail relay.

54. The system of claim 32, wherein the database includes a central database store, which is shared between a plurality of e-mail relay systems.

55. The system of claim 32, wherein the e-mail relay shares undesirable message data from the database with at least one other e-mail relay associated with a second database.

56. The system of claim 32, wherein the database accumulates message data corresponding to messages identified by a recipient as undesirable and forwarded to at least one e-mail address associated with the e-mail relay.

57. The system of claim 32, wherein the database accumulates message data corresponding to quarantined messages reviewed by an administrator and determined to be undesirable.

58. The system of claim 32, wherein undesirable messages are collected by recipients replying to unwanted messages and including a special code word within the reply.

59. The system of claim 32, wherein the e-mail relay associates a reporting URL with the intercepted message, the reporting URL allowing a recipient to report the intercepted message as an undesirable message.

60. The system of claim 32, wherein message attributes are selected from the group comprising message content, sender, subject, embedded URLs, Internet domain of the sending relay and IP address of the sending relay.

61. A system for controlling the reception of undesirable messages by resources associated with a local network, the system comprising:

means interposed along a communication path between the resources and a public network for intercepting messages destined for the resources from the public network; and means for storing attributes of known undesirable messages, the stored attributes corresponding to messages previously intercepted by the interception means and previously flagged as undesirable messages, the interception means employing the storage means to compare attributes of intercepted messages to the stored attributes of known undesirable messages, the interception means restricting the delivery of an intercepted message if a match score, based on comparison of message attributes and the stored attributes of undesirable messages, exceeds a threshold level.

* * * * *

UNITED STATES PATENT AND TRADEMARK OFFICE
CERTIFICATE OF CORRECTION

PATENT NO. : 7,389,413 B2  Page 1 of 1
APPLICATION NO. : 11/508779
DATED : June 17, 2008
INVENTOR(S) : Jean-Christophe Bandini et al.

It is certified that error appears in the above-identified patent and that said Letters Patent is hereby corrected as shown below:

Title page Item (57), Abstract, line 1, please replace "A" with --An--.

In column 1, line 53, please replace "a" with --an--;
In column 5, line 6, please insert --,-- after "level";
In column 5, line 21, please replace "in known" with --is known--;
In column 6, line 9, please replace "messages" with --message--;
In column 6, line 22, please replace "filed" with --field--;
In column 8, line 27, please replace "delivered is" with --delivered in--;

In column 10, claim 11, line 26, please insert --of-- after "records";
In column 13, claim 53, line 8, please delete "is".

Signed and Sealed this

Thirtieth Day of September, 2008

JON W. DUDAS
*Director of the United States Patent and Trademark Office*